Aug. 23, 1938.   N. T. DIETRICH   2,127,553
AUTOMOBILE FRAME
Original Filed July 14, 1934   2 Sheets-Sheet 1
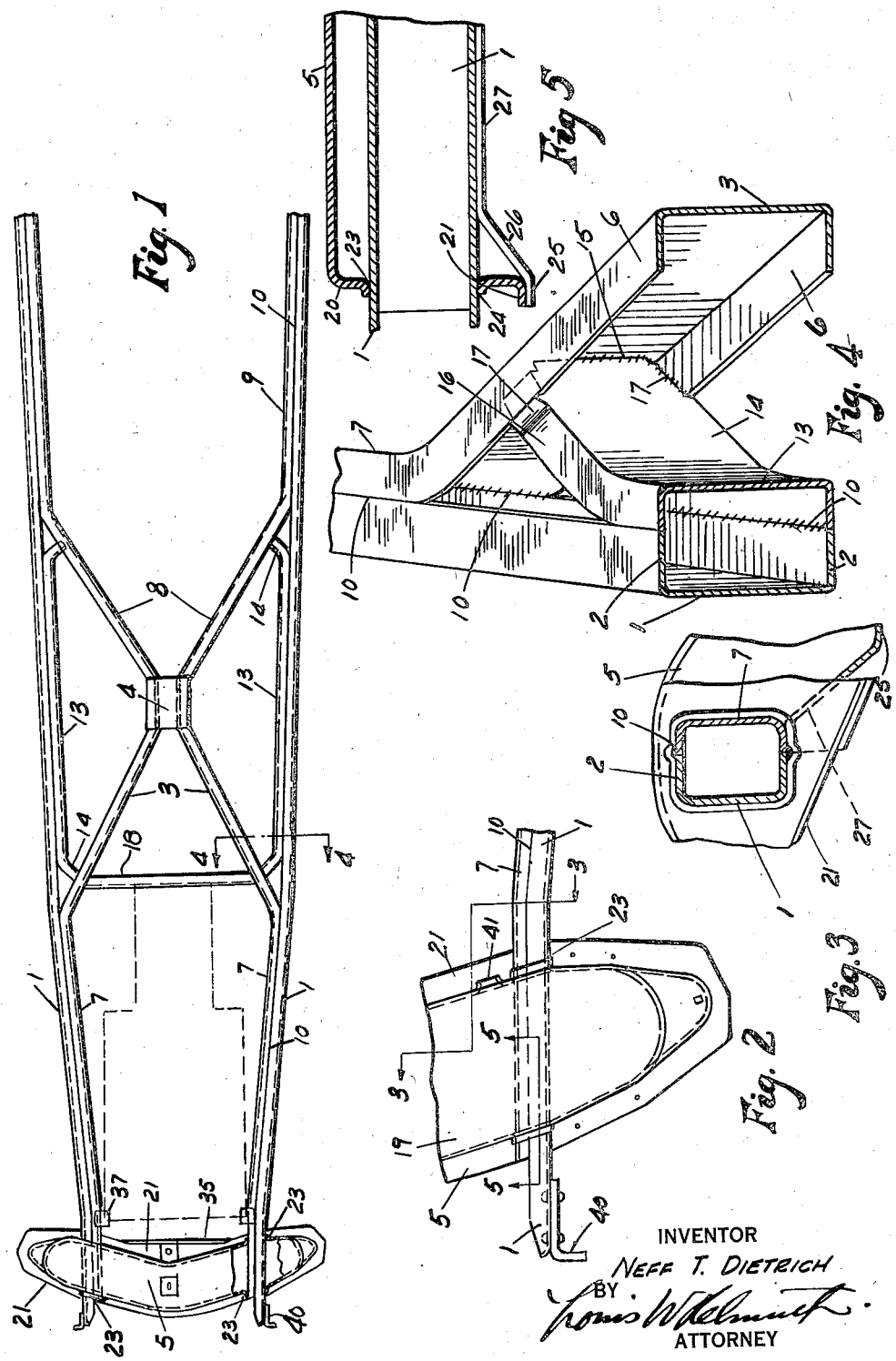
INVENTOR
NEFF T. DIETRICH
BY
ATTORNEY Aug. 23, 1938.  N. T. DIETRICH  2,127,553
AUTOMOBILE FRAME
Original Filed July 14, 1934  2 Sheets-Sheet 2
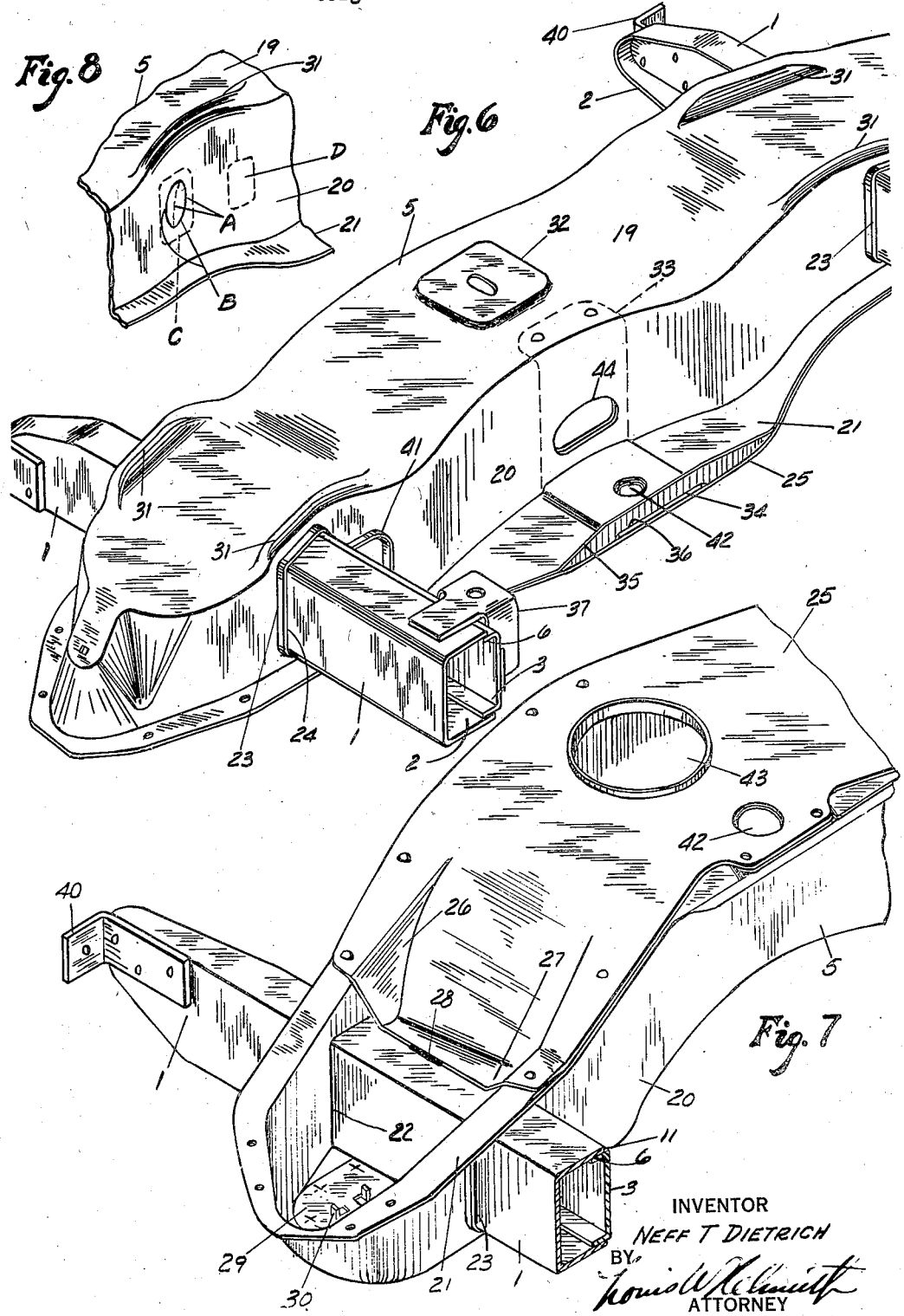
INVENTOR
NEFF T DIETRICH
BY
ATTORNEY Patented Aug. 23, 1938

2,127,553

UNITED STATES PATENT OFFICE 2,127,553

AUTOMOBILE FRAME

Neff T. Dietrich, Detroit, Mich., assignor to The Midland Steel Products Company, Cleveland, Ohio, a corporation of Ohio Original application July 14, 1934, Serial No. 735,254. Divided and this application November 14, 1935, Serial No. 49,815

4 Claims. (Cl. 280—106)

This invention relates to new and useful improvements in automobile frames and is a division of my co-pending application Serial Number 735,254 filed July 14, 1934.

An important object of the invention is to provide a simple but yet extremely sturdy connection between the longitudinal and transverse members of the frame, which is well suited for vehicles embodying independent springing of the wheels.

Another object of the invention is to provide a frame which possesses a very high torsion and shear resisting value and one which lends itself to economical fabrication.

Other objects and advantages of the invention will become apparent during the course of the following description.

In the accompanying drawings forming a part of the description and wherein like numerals are employed to designate like parts throughout the several views, Fig. 1 is a top plan of the improved frame.

Fig. 2 is an enlarged top plan of one corner of the frame illustrating the manner of connecting the longitudinal and transverse members, Fig. 3 is a transverse section of the same taken on the line 3—3 of Fig. 2, Fig. 4 is an enlarged transverse section of the frame taken on the line 4—4 of Fig. 1.

Fig. 5 is a section taken on the line 5—5 of Fig. 2,

Fig. 6 is an enlarged perspective view of the transverse member illustrating the manner of connecting the longitudinal members therewith, Fig. 7 is a similar view of the same viewed from the underside thereof, and Fig. 8 is a fragmentary perspective view of a portion of the transverse member illustrating the approximate location of the openings through which the longitudinal rails are adapted to extend.

Referring now more in detail to the drawings, the numeral 1 designates a pair of longitudinal side rails for the frame. These are of channel cross section possessing inwardly extending parallel flanges 2, to which are secured the forwardly extending arms 3 of an X-shaped member indicated in its entirety by the numeral 4. This X-shaped member is spaced a substantial distance from the forward transverse cross member 5 and preferably at substantially the midsection of the frame. These arms 3 diverge forwardly of the frame and have their flanges 6 extending outwardly toward the side rails 1 and where they meet the side rails, are bent to extend parallel therewith as at 7 with the flanges 6 thereof secured to the flanges 2 of the side rail to form the same into closed box cross section all the way out to substantially the free forward ends of the side rails. The rearwardly diverging arms 8 of the X-member 4 are of similar shape and cross section and are bent to parallel the rear portions of the side rails as at 9 whereby their flanges can be fastened to those of the side rails in any suitable manner. However, in the present instance, and in Figs. 1 to 5 inclusive, the flanges 6 of the arms 3 and 8 of the X member are arranged in the same plane with those of the flanges 2 of the side rails for butt-welding thereto along the lines 10, while the form of rail shown in Figs. 6 and 7, the extensions of the arms of the X-member which parallel the side rails are nested within the channel rails and arranged to extend in directions opposite the flanges of the side rails with the latter overlapping and arc welded at their two inner corners as designated by the numeral 11. However, it is to be understood that I do not wish to limit the invention to the manner in which the side rails are formed into closed box cross section since the flanges may be riveted or spot welded together, and the extensions of the X-member may be arranged with their flanges extending in the same direction as those of the side rails in order that the webs may be spaced apart and the flanges extend in the same direction to provide overlapped flanges exposed on both sides for either riveting or welding.

The forward and rear arms of the X-member may be connected together with gusset plates at their intersection or in any other suitable manner, or the corresponding arms 3 and 8 on the same side of the center line of the frame may be integral and formed all in one piece with the extensions 7 and 9 if so desired. Should it be desired to form the portions of the side rails 12 between the respective arms 3 and 8 into closed box cross section, channel-shaped reinforcements 13 have their flanges secured to those of the side rails as shown in Fig. 1. The ends of each reinforcement 13 may be bent inwardly as at 14 at points spaced from the points where the arms of the X member merges into the side rail and may be connected to the arms of the X-member, preferably in the manner shown in Fig. 4 where the web of the reinforcement is welded along a vertical line 15 to the web of the X-member arm. The flanges 16 of the angular ends 14 may be welded as at 17 to the flanges 6 of the cross member arms as shown by the cross hatching.

A rear motor support is provided in a transverse member 18 arranged between the forwardly diverging arms 3 of the X member and secured thereto in any suitable manner, or this transverse member 18 may form an integral part of one or both reinforcements 13 on opposite sides of the vehicle frame.

The forward cross member 5 of this frame is of unusual construction due to the functions it must perform. As indicated previously, this type of frame is particularly applicable to the independent springing of the front wheels of the type which appeared on the 1934 Buick models known as the Lomier type embodying the coiled springs and inwardly diverging links pivotally connecting the steering axles with the front cross member. Due to the strength which must be built into such supporting structure, and the necessary strength of the connection between the cross member and side rails which must exist to take the strains imposed upon these two members by the independent springing of the wheels, the forward boxed in sections of the side rails are extended through and beyond the front walls of this cross member 5. This construction provides the requisite rigidity to sustain the loads in this innovation of wheel mounting.

This cross member 5 is of inverted channel cross section with a web or roof 19 and vertically depending parallel flanges 20 which terminate in outwardly and laterally extending flanges 21 surrounding the entire transverse or cross member. The forward and rear vertical flanges 20 are provided with aligned perforations 22 with the metal surrounding each perforaton formed outwardly of the side of the cross member into outwardly extending flanges 23 which closely embrace the forward ends of the hollow side rails 1. As will appear from Figs. 1 and 2, the forward extensions 7 of the X member forward arms also extend through and beyond the cross member 5 so that the box cross section of the rail is carried all the way through the cross member to terminate slightly forwardly thereof where the spring hanger brackets 40 are secured to the forward extreme ends of the side rails 1. In order to firmly anchor and secure the cross member to the side rails, the flanges 23 surrounding the box section rail are welded, preferably by arc welding all the way around their circumference and all the way around the perimeter of the side rails. This line of weld is indicated more clearly by the numeral 24 in Fig. 6.

The cross member 5 is formed with box-like cross section throughout the major portion of its length by fastening to the laterally extending flanges 21 by alternate rivets and spot welding, a bottom plate 25 conforming to the outline or configuration of the cross member. At each end of the plate 25, a depression is formed therein substantially of the same width as the distance between the parallel flanges 20 to extend inside of the cross member and form a lip or offset flange portion 27 which is welded as at 28 to the underside of the box section rail as shown more clearly in Fig. 7. This provides an extremely strong connection between the cross member and side rails.

To the underside of the roof of the cross member 5 at its two ends is welded a reinforcing plate 29 having opposed lugs 30 struck therefrom to form a mounting for the upper end of a coil spring of each independently sprung wheel.

As best seen from Fig. 1, the closed box section front cross member 5 is a body formed into a pair of rearwardly diverging arms from a point at the longitudinal center of the frame. In order to add to the strength of the cross member, an upstanding rib 31 is raised in the roof of the cross member above each connection with the side rail to extend substantially transversely of the side rail. These ribs have their greatest height immediately above the side rail and gradually merge into the plane of the roof 19 as clearly shown in Fig. 6.

The perforations through the flanges of the cross members for projection of the side rails are stretched and developed from elliptical shaped openings A in a flat blank as shown in Fig. 8 to the shape shown by the letter B during the several forming operations to which the blank must be subjected to bring it to the form shown in Fig. 6. Thereafter, the flanges 20 are perforated along the dotted lines C and D simultaneously with the formation of the flanges 23 surrounding these openings. In the flanges 20 adjacent the rail 1, a flange 41 is provided around opening D for the extension of the steering gear. A pedestal 32 is raised on the roof 19 at the center of the cross member 5 for the attachment of the radiator. Behind this embossed pedestal 32 an angular reinforcement plate 33 is attached with its angular base extended out between the base plate 25 and the wide intermediate portion of flange 21 which has an upturned lip 35 provided with an opening 36 for the extension of the angular lower end of the reinforcing plate 33. This provides a substantial mounting for the steering connection. Immediately behind this cross member are fixed motor mounting brackets 37 on each side rail as shown in Fig. 6.

Registering perforations 42 are provided in the rear flange 21 reinforcing plate 33 and bottom plate 25 for the steering connection mounting and opening 44 is provided in the flange 20 for the extension of the steering connection. A flanged opening 43 is provided at the center of the base plate 25 to afford access to the interior of the box section cross member as well as to facilitate the mounting of the steering connection and connection of the radiator.

It is to be understood that the various parts of the frame are applicable to other types of frames and that the scope of the appended claims is to be governed accordingly.

I claim:

1. In a vehicle frame, a transverse inverted channel shaped member having a pair of vertical spaced walls terminating in lateral horizontal flanges, a longitudinal member extending through both walls, and a base plate secured to said flanges to form the transverse member into closed box section, said plate having a portion offset into the transverse member and secured to the longitudinal member.

2. In a vehicle frame, a transverse inverted channel-shaped cross member having a horizontal web and a pair of vertical spaced walls terminating in horizontal flanges, a base plate secured to said flanges to form the cross member into closed box section, said vertical walls having opposed aligned openings, side rails having their forward ends extended through the openings in both vertical walls and welded thereto, and the base plate having portions offset and extending inwardly into the box section cross member and welded to the side rails.

3. In a vehicle frame, a transverse inverted channel-shaped cross member having a horizontal web and a pair of vertical spaced walls terminating in lateral horizontal flanges, a base plate secured to said flanges to form the cross member into closed box section, said vertical walls having opposed aligned openings with surrounding flanges, said web having ribs pressed up above said openings, side rails having their forward ends extended through the openings in both vertical walls and welded thereto, and the base plate having portions offset into the box section cross member and provided with lips welded to the side rails.

4. In a vehicle frame, a transverse inverted channel-shaped cross member having a horizontal web and a pair of vertical spaced walls, said member having its ends diverging rearwardly from the longitudinal center of the frame, said side walls terminating in lateral horizontal flanges, and the flange between the diverging portions of the cross member being relatively wide and provided with a vertical lip to support steering apparatus.

NEFF T. DIETRICH.